United States Patent
Wang et al.

(10) Patent No.: US 6,864,617 B1
(45) Date of Patent: Mar. 8, 2005

(54) RETAINING SYSTEM FOR A ROTOR OF A DYNAMOELECTRIC MACHINE

(75) Inventors: Yu Wang, Clifton Park, NY (US); George Hanna Ghanime, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/605,491

(22) Filed: Oct. 2, 2003

(51) Int. Cl.[7] ............................................... H02K 3/46
(52) U.S. Cl. .................................... 310/270; 310/214
(58) Field of Search .............................. 310/214, 270, 310/271

(56) References Cited

U.S. PATENT DOCUMENTS

| | | | | |
|---|---|---|---|---|
| 4,091,301 A | * | 5/1978 | Blank ........................ | 310/270 |
| 4,143,290 A | * | 3/1979 | Mizukami et al. ........... | 310/270 |
| 4,177,398 A | * | 12/1979 | Zagorodnaya et al. ...... | 310/270 |
| 4,912,354 A | | 3/1990 | Frank ........................ | 310/271 |
| 5,068,564 A | | 11/1991 | Frank ........................ | 310/270 |
| 5,113,114 A | * | 5/1992 | Shih et al. .................. | 310/270 |
| 5,329,197 A | | 7/1994 | Kudlacik .................... | 310/198 |
| 6,285,110 B1 | | 9/2001 | Tong et al. ................. | 310/270 |
| 6,495,942 B1 | | 12/2002 | Kaminski et al. ........... | 310/262 |
| 6,590,311 B1 | | 7/2003 | Wang et al. ................ | 310/261 |

* cited by examiner

*Primary Examiner*—Burton Mullins
(74) *Attorney, Agent, or Firm*—Ernest Cusick; Gary M. Hartman; Domenica N. S. Hartman

(57) ABSTRACT

A retaining system for field winding end turns of a rotor, such as for a dynamoelectric machine. The rotor has an outer peripheral surface, radial end surfaces, axially-extending slots in the peripheral surface, and field windings in the slots. The field windings axially project from the end surfaces of the rotor and are connected outside of the slots by field winding end turns. The end turns are surrounded by the retaining system, which includes a shield member surrounding the end turns and a retainer member surrounding to the shield member. The shield member has flanges received in the slots along with the field windings. Fastening features engage the flanges to inhibit axial movement of the retaining system.

20 Claims, 2 Drawing Sheets

RETAINING SYSTEM FOR A ROTOR OF A DYNAMOELECTRIC MACHINE

BACKGROUND OF INVENTION

1. Field of the Invention

The present invention generally relates to rotors of dynamoelectric machines, such as generators used in the production of electrical power. More particularly, this invention relates to a retaining ring for supporting field end windings of such a rotor, wherein the retaining ring has a composite construction that provides a high-strength, low-density support structure for the field end windings.

2. Description of the Related Art

Large turbine-driven generators used in the production of electrical power comprise a rotor that serves as a source of magnetic lines of flux produced by a wound coil carried on the rotor. The rotor rotates within a stator that comprises a number of conductors in which an alternating current is induced by the rotor as it rotates within the stator, generating a rotating magnetic field in a narrow air-gap between the stator and rotor.

A rotor 10 illustrative of the type used in turbine-driven generators is depicted in FIGS. 1 and 2. The rotor 10 is generally a large cylindrical body from which spindles 12 extend for rotatably supporting the rotor 10. The rotor 10 has a series of longitudinal (axially-extending) slots 14 machined radially into its outer circumference, which results in radially-extending teeth 15 being defined along the perimeter of the rotor 10. Field windings 17, comprising multiple insulated conductor strands, are installed in the slots 14 to extend the length of the rotor 10, longitudinally projecting from each end 26 of the rotor 10. The field windings 17 include end turns 18 (FIG. 2), each of which electrically connects the longitudinal portion of a winding in one slot 14 with the longitudinal portion of a winding in an adjacent slot 14. The field windings 17 do not fill the entire slot 14, which typically has a tapered region so that the slot 14 is narrower at the perimeter of the rotor 10. Wedges (not shown) are placed in the tapered region of each slot 14 to hold the windings 17 in place against centrifugal forces exerted when the rotor 10 rotates.

As the rotor 10 spins, the end turns 18 are also subjected to centrifugal forces that urge the end turns 18 radially outward. This radial movement of the end turns 18 is confined by retaining rings 16 that are attached to the ends of the rotor 10 to enclose the end turns 18, as shown in FIG. 2. As is widely practiced, retaining rings 16 of the type shown in FIG. 2 are attached to the ends of the rotor 10 by shrink fitting. In FIG. 2, the inboard end of the retaining ring 16 is shrink-fit around a shoulder 20 defined on the rotor 10, and a locking key 22 is provided between the ring 16 and rotor 10 to prevent axial movement of the ring 16. The retaining ring 16 is also supported at its outboard end with a centering ring 24, onto which the ring 16 is also preferably shrink-fitted.

Centrifugal forces generated as a result of the spinning rotor 10 cause the end turns 18 to press firmly against the inside surface of each retaining ring 16, applying a considerable force to the rings 16. Consequently, the retaining rings 16 are typically formed of a high-strength, nonmagnetic steel such as 1818 material. Sources of 1818 steel are limited and delivery cycles can be long, resulting in high costs. As rotor diameters and spin speeds increase, so do the centrifugal forces applied to the rings 16 by the end turns 18. However, because of the density of 1818 steel, as rotor spin speeds increase a significant part of the radial thickness of the ring 16 is required to resist the centrifugal forces generated as a result of its own weight. Furthermore, separation of the ring 16 and rotor 10 becomes a design challenge at higher rotor speeds.

In view of the above, lower-density composite retaining rings have been proposed, as well as other types of retaining systems. Examples include an epoxy-graphite retaining ring taught in commonly-assigned U.S. Pat. No. 5,068,564 to Frank. There is a demand for further improvements in the construction and implementation of low-density retaining rings.

SUMMARY OF INVENTION

The present invention provides a retaining system for a rotor of a dynamoelectric machine, such as a generator used in power generation of alternating current delivered to a distribution network. The rotor is of a type that comprises an outer peripheral surface, oppositely-disposed radial end surfaces, axially-extending slots in the outer peripheral surface of the rotor, and field windings in the slots. The field windings axially project from the end surfaces of the rotor and are connected together outside of the slots by field winding end turns. The slots having cross-sections of sufficient size so that the field windings are present within a first portion of each slot and not present within a second portion of each slot.

In accordance with this invention, the retaining system surrounds at least one of the field winding end turns at a first end of the rotor. The retaining system comprises a shield member surrounding the field winding end turns, and a retainer member surrounding the shield member to inhibit radially-outward movement of the shield member. For this purpose, the retainer member is preferably formed of a relatively low-density, high strength composite material. The shield member has a circumferential row of axially-extending flanges that are received in the second portions of the slots. One or more fastening features surround the flanges and the first end of the rotor so as to inhibit axial movement of the retaining system.

A notable aspect of the present invention is that the retaining system has a relatively uncomplicated construction, yet provides both the strength and rigidity necessary to restrain the end turns of the field windings, even when subjected to high centrifugal forces generated when the rotor spins at high speeds. If the retainer member is formed of a composite material instead of a high-strength, nonmagnetic steel such as 1818, the invention avoids the disadvantages associated with using 1818 steel, such as limited sources, long delivery cycles, and the high costs associated therewith. The relatively low density possible for a retainer member formed of a composite material permits the use of rotors having larger diameters and higher spin speeds than is practical when using the more dense 1818 steel.

Other objects and advantages of this invention will be better appreciated from the following detailed description.

DETAILED DESCRIPTION

Figure 1:
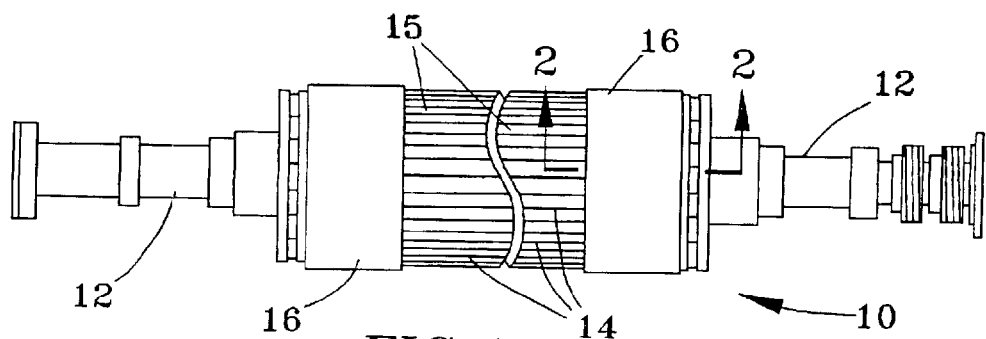
FIG. 1 shows a rotor equipped with retaining rings in accordance with the prior art.
Figure 2:
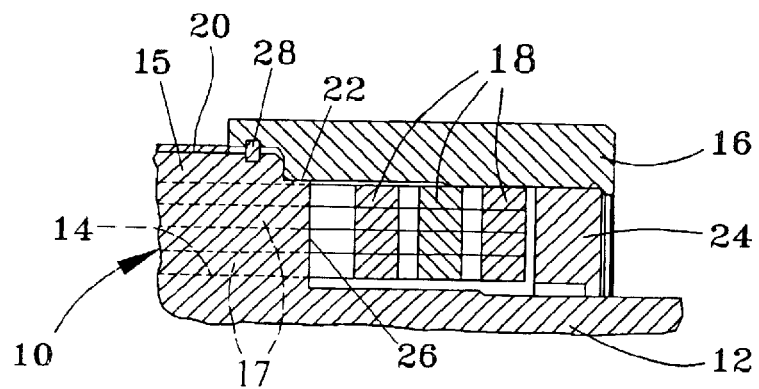
FIG. 2 is a partial sectional view of the rotor of FIG. 1, showing one of the retaining rings in greater detail.
Figure 3:
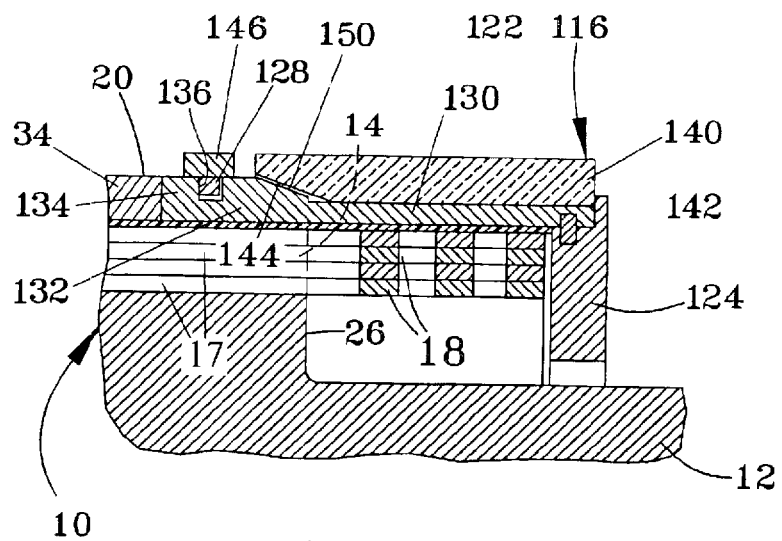
FIG. 3 is a partial sectional view of a rotor similar to that of FIGS. 1 and 2 but equipped with a retaining system that comprises an inner shield member and outer retainer member in accordance with the present invention.
Figure 4:
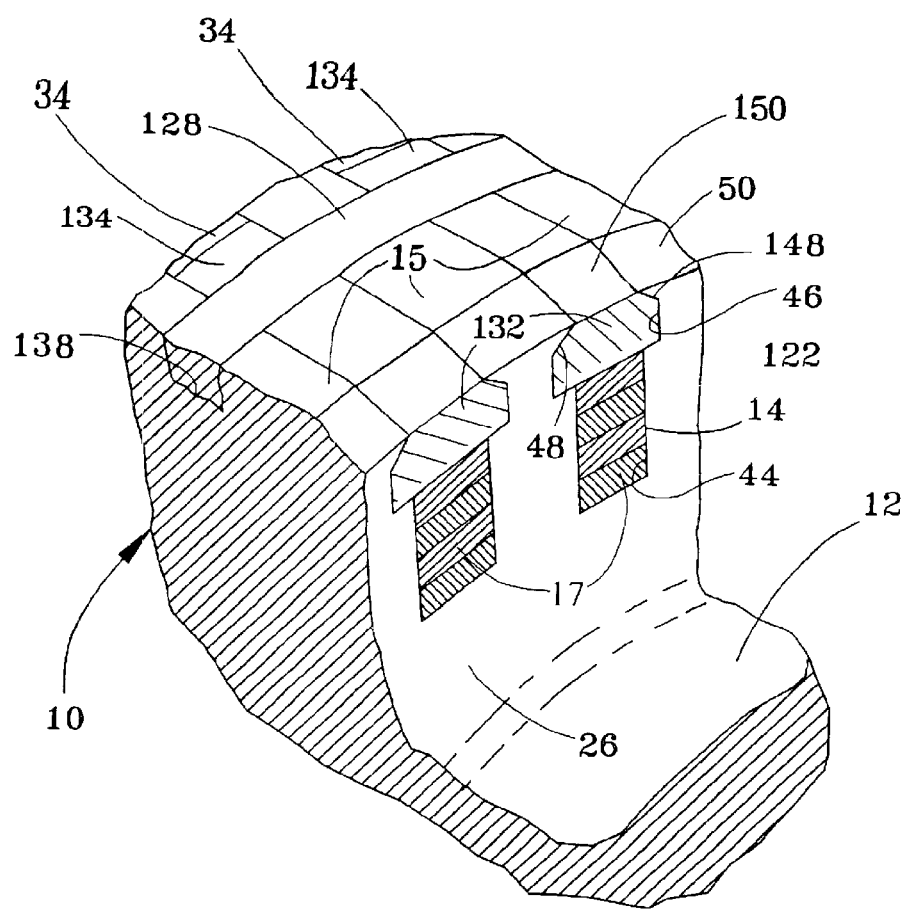
FIG. 4 is a partial sectional perspective view showing flange portions of the shield member of FIG. 3 inserted into field winding slots of the rotor.

FIGS. 3 and 4 represent partial sectional views of a rotor 10 similar to the rotor 10 of FIGS. 1 and 2, such that the same reference numbers will be used to identify the same or equivalent features of the rotors 10. As such, the rotor 10 is of the type used in power generation plants that serve as primary suppliers of high-voltage alternating current to a distribution or transmission network, though the rotor 10 could be used in other applications.

As with the rotor 10 of FIGS. 1 and 2, the rotor 10 of FIGS. 3 and 4 has a cylindrical-shaped body with an outer peripheral surface 20 and radial end surfaces 26 at oppositely-disposed ends of the cylindrical body. Furthermore, slots 14 are present in the peripheral surface 20 of the rotor 10, defining radially-extending teeth 15 (FIG. 4) at the peripheral surface 20. Field windings 17 are present in the slots 14 and axially project from the end surfaces 26 of the rotor 10. As best seen from FIG. 4, each slot 14 has a cross-sectional shape and size to receive the field windings 17 within a radially inward portion 44, while radially outward portions 46 of the slots 14 receive flanges 132 that are part of an end turn retaining system 116 in accordance with an embodiment of this invention, discussed in further detail below. As with FIG. 2, FIG. 3 shows the field windings 17 as being interconnected outside the slots 14 by field winding end turns 18.

From FIG. 3, it can be appreciated that the field windings 17 and end turns 18 are subject to considerable centrifugal forces when the rotor 10 is rotating, particularly with increasing rotor diameter and speed. In accordance with conventional practice, the radially outward portions 46 of the slots 14 include tapered regions 48, enabling retention of the field windings 17 with wedges 34 installed in the radially outward portions 46 of the slots 14. The retaining systems 116 of this invention surround the end turns 18 of the field windings 17 at each end of the rotor 10, thereby preventing radial outward movement of the end turns 18 when the rotor 10 is spinning.

As depicted in FIG. 3, each retaining system 116 generally comprises an annular-shaped shield member 130 that surrounds one of the end turns 18, and an annular-shaped retainer member 140 that surrounds the shield member 130. The axially inboard end of the shield member 130 (i.e., the end nearer the longitudinal center of the rotor 10) is anchored to the rotor 10 with above-noted the flanges 132 while its outboard end is supported by a centering ring 124, to which the shield member 130 is shown as being secured with a locking ring 142, though other attachment means are foreseeable. The shield member 130 preferably serves as an electromagnetic (EM) shield, and is therefore formed of a highly electrically-conductive material, such as aluminum or copper. Strength is another desirable characteristic for the shield member 130, such that steel alloys are also suitable material candidates. Ground insulation 122 is preferably present as an electrical barrier between the shield member 130 and the field windings 17 and end turns 18.

The flanges 132 extend axially inboard from the inboard end of the shield member 130, and are preferably aligned in a circumferential row along the entire circumference of the inboard end of the shield member 130. As most readily seen from FIG. 4 (in which the retainer member 140 is omitted for clarity), each flange 132 is axially aligned with and individually received in one of the radially-outward portions 46 of a slot 14 near the end surface 26 of the rotor 10, such that each flange 132 is between adjacent pairs of teeth 15. As also seen from FIG. 4, each flange 132 has a cross-sectional shape complementary to the radially-outward portion 46 of the slot 14, including a tapered shoulder 148 that abuts the tapered region 48 of the slot 14 so as to retain the flange 132 and its associated field winding 17 within the slot 14, preventing their radially outward movement when the rotor 10 is spinning.

Each flange 132 is also shown as having a radially-outward extending nub 134, shown at the inboard extremity of each flange 132, and a tapered face 150 spaced apart from the nub 134 by a channel 136. The tapered faces 150 of the flanges 132 are aligned with tapered faces 50 on the teeth 15 adjacent the end surface 26 of the rotor 10. The tapered faces 50 and 150 of the teeth 15 and flanges 132 taper radially inward toward the end surface 26. The teeth 15 are also formed to have channels 138 that, with the channels 136 of the flanges 132, define a continuous circumferential groove in the outer peripheral surface 20 of the rotor 10. A locking ring 128 is installed in the groove 136/138 to secure the shield member 130 to the rotor 10 by preventing the flanges 132 from becoming dislodged axially from the slots 14. Finally, a cover ring 146 (omitted from FIG. 4 for clarity) surrounds the locking ring 128 so as to retain the ring 128 in the groove 136/138.

Figure 5:
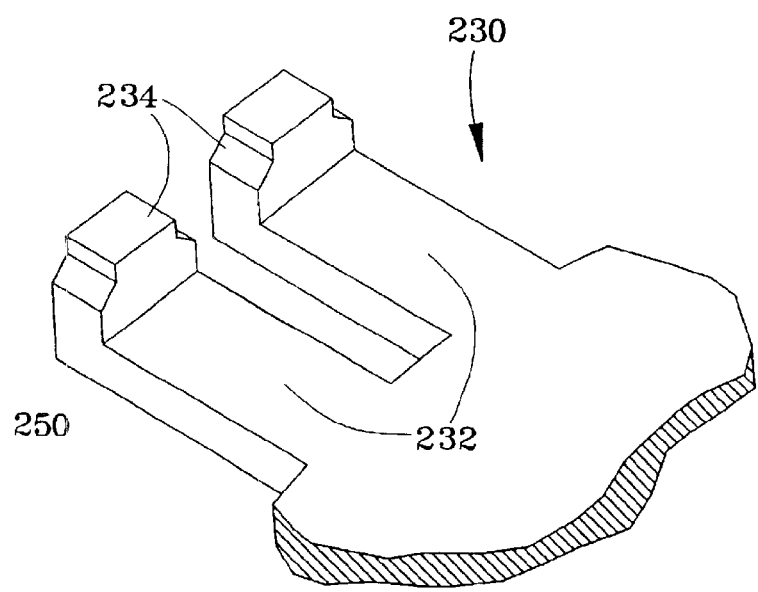
FIG. 5 is a partial perspective view showing a shield member with modified flange portions in accordance with an alternative embodiment of the present invention.

An alternative configuration for the flanges 132 of the shield member 130 is represented in FIG. 5, in which a shield member 230 is shown whose flanges 232 have radially-outward extending nubs 234 at their inboard extremity, but lack the tapered faces 150 of the flanges 132 shown in FIGS. 3 and 4. As such, the flanges 232 lack the channels 136 aligned with the tooth channels 138 for receiving the locking ring 128 as described in reference to FIGS. 3 and 4. Instead, the locking ring 128 simply abuts the outboard face 250 of each nub 234, again with the effect that the flanges 232 are prevented from being dislodged axially outboard from the slots 14. Separate wedge pieces (not shown) can be assembled with the flanges 232 to define, with the tapered faces 50 on the teeth, a tapered shoulder similar to that formed by the tapered faces 50 and 150 in FIG. 4.

The retainer member 140 of this invention is preferably formed of a relatively low-density, high-strength material, such as a fiber-reinforced composite material. A particularly suitable composite material is a graphite fiber-epoxy composite. The retainer ring 140 can be manufactured by winding graphite fibers on a cylindrical mandrel, followed by impregnation with epoxy and then curing. Alternatively, a resin-impregnated fiber (tow) could be wound on a cylindrical mandrel and then cured. The retainer member 140 is intended to provide mechanical strength and rigidity to the shield member 130 to inhibit radially-outward movement and distortion of the shield member 130, particularly if the shield member 130 is formed of a relatively low-strength material such as aluminum or copper. For this reason, the inner diameter surface of the retainer member 140 is preferably in surface-to-surface contact with the outer diameter surface of the shield member 130. As seen in FIG. 3, this surface-to-surface contact between the shield and retainer members 130 and 140 preferably includes the tapered faces 150 of the flanges 132 as a result of the retainer member 140 having a tapered inboard end 144 that is complementary to and surrounds the tapered faces 50 and 150 of the teeth 15 and flanges 132.

Because fiber-reinforced composite materials that are candidates for the retainer member 140 are not weldable and generally expand little compared to metals, the retainer member 140 benefits from being anchored to the rotor 10 through the shield member 130. The retainer member 140 is preferably attached to the shield member 130 in some way so that the shield and retainer members 130 and 140 form a unitary assembly. For example, the retainer member 140 can be shrunk-fit onto the shield member 130, or provided with a clearance fit into which a bonding material is injected to bond the retainer member 140 to the outer surface of the shield member 130. Attachment of the retainer member 140 to the shield member 130 can be performed during manufacturing of the retaining system 116 or in the field. While shown as a unitary piece, the retainer member 140 could be an assembly of multiple rings.

While the invention has been described in terms of a particular embodiment, it is apparent that other forms could be adopted by one skilled in the art. Therefore, the scope of the invention is to be limited only by the following claims.

What is claimed is:

1. A rotor of a dynamoelectric machine, the rotor comprising an outer peripheral surface, oppositely-disposed radial end surfaces, axially-extending slots in the outer peripheral surface of the rotor, and field windings in the slots, the field windings axially projecting from the end surfaces of the rotor and being connected together outside of the slots by field winding end turns, the slots having cross-sections of sufficient size so that the field windings are present within a first portion of each slot and not present within a second portion of each slot, the rotor comprising a retaining system surrounding at least one of the field winding end turns at at least a first end of the rotor, the retaining system comprising:

a shield member surrounding the field winding end turns, the shield member having flanges that are received in the second portions of the slots adjacent the end surface at the first end of the rotor;

a retainer member surrounding the shield member and inhibiting radially-outward movement of the shield member, the retainer member being formed of a material that is more rigid than the material of the shield member; and means for inhibiting axial movement of the retaining system relative to the rotor.

2. A rotor according to claim 1, wherein the retainer member is bonded to the shield member.

3. A rotor according to claim 1, wherein the retainer member is shrink-fit on the shield member.

4. A rotor according to claim 1, wherein the material of the retainer member is a fiber-reinforced composite material.

5. A rotor according to claim 1, wherein the shield member is formed of an electromagnetic shielding material.

6. A rotor according to claim 1, wherein the inhibiting means comprises a circumferential groove in the outer peripheral surface of the rotor and a ring received in the groove and engaged with the flanges of the shield member.

7. A rotor according to claim 6, wherein each of the flanges has a radially-extending portion axially inboard from the ring and abutting the ring to prevent axially outboard movement of the shield member.

8. A rotor according to claim 6, wherein each of the flanges has a groove circumferentially aligned with the groove in the outer peripheral surface of the rotor, the ring being received in the grooves of the flanges.

9. A rotor according to claim 1, wherein the flanges are received in the second portions of the slots so as to inhibit radially outward movement of the field windings within the slots.

10. A rotor according to claim 1, wherein the slots in the rotor and each of the flanges have complementary tapered cross-sectional shapes that inhibit radially outward movement of the flanges within the slots.

11. A rotor according to claim 1, wherein the outer peripheral surface of the rotor has a tapered portion adjacent the end surface at the first end of the rotor, the tapered portion tapering radially inward in a direction toward the end surface.

12. A rotor according to claim 11, wherein the retainer member has a tapered inboard end surrounding and complementary to the tapered portion of the outer peripheral surface.

13. A rotor according to claim 12, wherein the flanges have tapered portions complementary to the tapered inboard end of the retainer member, the tapered inboard end of the retainer member surrounding the tapered portions of the flanges.

14. A rotor of a generator used in power generation of alternating current delivered to a distribution network, the rotor comprising a cylindrical body having an outer peripheral surface and radial end surfaces at oppositely-disposed ends of the cylindrical body, spindles axially extending from the end surfaces of the cylindrical body, axially-extending slots in the outer peripheral surface of the cylindrical body so as to define radially-extending teeth at the outer peripheral surface, a circumferential groove in the outer peripheral surface adjacent each of the end surfaces, and field windings in the slots, the field windings axially projecting from the end surfaces of the cylindrical body and being connected together outside of the slots by field winding end turns, the slots having cross-sections of sufficient size so that each of the field windings is present within a first portion of each slot and not present within a second portion of each slot, the rotor further comprising first and second retaining systems surrounding the field winding end turns at the ends of the cylindrical body, each of the retaining systems comprising:

an annular-shaped electromagnetic shield member surrounding one of the field winding end turns, the electromagnetic shield member having a circumferential row of flanges extending axially from an inboard end thereof, the flanges being individually received in the second portions of the slots open to one of the end surfaces of the rotor so that each of the flanges is between adjacent pairs of the teeth of the cylindrical body, each of the flanges having a radially-outward extending portion;

a ring received in one of the grooves of the cylindrical body, axially outboard from the radially-outward extending portions of the flanges, and abutting the radially-outward extending portions of the flanges to prevent axially outboard movement of the retaining system; and an annular-shaped retainer member surrounding and attached to the electromagnetic shield member to inhibit radially-outward movement of the electromagnetic shield member, the retainer member being formed of a graphite fiber-reinforced composite material that is less dense and more rigid than the material of the electromagnetic shield member.

15. A rotor according to claim 14, wherein the retainer member is bonded to the electromagnetic shield member.

16. A rotor according to claim 14, wherein the retainer member is shrink-fit on the electromagnetic shield member.

17. A rotor according to claim 14, wherein each of the flanges has a groove circumferentially aligned with the groove in the outer peripheral surface of the cylindrical body, the ring being received in the grooves of the flanges.

18. A rotor according to claim 14, wherein the flanges are received in the second portions of the slots so as to inhibit radially outward movement of the field windings within the slots.

19. A rotor according to claim 14, wherein the slots in the cylindrical body and each of the flanges have complementary tapered cross-sectional shapes that inhibit radially outward movement of the flanges within the slots.

20. A rotor according to claim 14, wherein the teeth and the flanges have tapered portions adjacent the end surface at the cylindrical body, the tapered portions of the teeth and the flanges taper radially inward in a direction toward the end surface, the retainer member has a tapered inboard end complementary to the tapered portions of the teeth and the flanges, and the tapered inboard end of the retainer member surrounds the tapered portions of the teeth and the flanges.

* * * * *